UNITED STATES PATENT OFFICE.

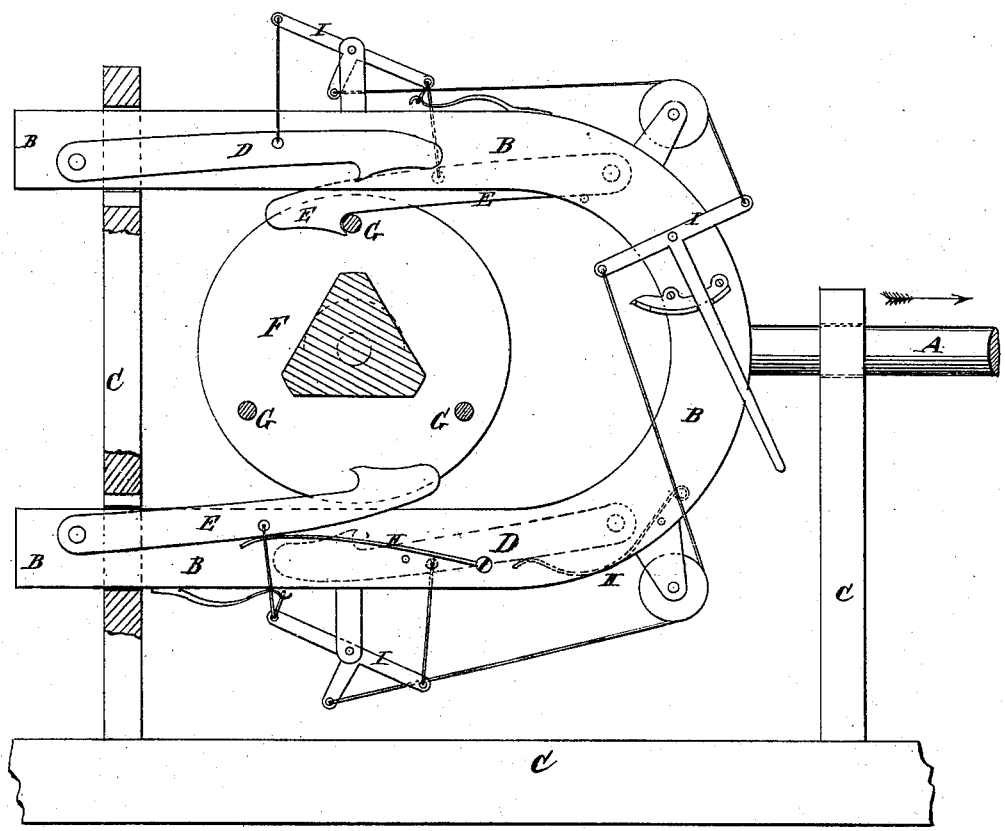

MINER G. MOSHER, OF WICHITA, KANSAS.

IMPROVEMENT IN MECHANICAL MOVEMENTS.

Specification forming part of Letters Patent No. 178,074, dated May 30, 1876; application filed April 25, 1876.

*To all whom it may concern:*

Be it known that I, MINER G. MOSHER, of Wichita, county of Sedgwick and State of Kansas, have invented a new and Improved Mechanical Movement, of which the following is a specification:

The figure is a side view of my improved device, partly in section, to show the construction.

The object of my invention is to furnish an improved device for converting a reciprocating into a rotary motion, which shall be simple in construction, convenient in use, and effective in operation, and which shall have no dead-points, and will apply all the power effectively.

My invention consists in the combination of the U bar or fork, provided with two pairs of hook-pawls, with the wheel provided with the bolts, for converting a reciprocating into a rotary motion; and in the combination of the three three-armed or T bars and their connecting rods or chains with the U bar or fork and with the two sets of hook-pawls, as hereinafter fully described.

A represents the piston-rod of an ordinary steam-engine, to the outer end of which is attached a U-shaped cross-head or fork, B. The piston-rod A and the arms of the fork B slide in guides C, to cause them to move in a straight line. To the outer end of one of the arms of the fork B, and to the inner end of the other arm, are pivoted the outer ends of two hook-pawls, D, the hooks of which are formed upon their inner sides, near their inner or free ends, and their inner sides, between the said hooks and ends, are slightly concaved, as shown in the figure. To the arms of the fork B, in a reverse position from and arranged diagonally with the hook-pawls D, are pivoted a second pair of hook-pawls, E, exactly like the pawls D. The pawls D are designed to give a forward motion to the machinery to be driven, and the pawls E to give a backward motion to said machinery. To the shaft to be driven is attached a drive-wheel, F, consisting of a hub and two disks. The outer parts of the disks of the wheel F are connected by three bolts, G, placed equally distant from each other and from the axis of the wheel. The bolts G serve as teeth for the hooks D and E to take hold of, to turn the said wheel. When the wheel F is vertical the upper hooks will be held down by their own weight, and the lower hooks must be held up by springs H. When the wheel F is horizontal all the hooks must be held forward by springs. The movements of the hooks are limited by pins or other stops attached to the arms of the fork B. To each of the arms of the fork B is pivoted a three-armed or T bar, I, the ends of the side arms of which are connected with the two hooks pivoted to said arms by rods or chains, so that, by working the said bar, either of said hooks may be brought into working position, so that the motion may be conveniently reversed.

The center arms of the two bars I are connected by chains, or rods and chains, passing over guide-pulleys, with the side arms of a third three-armed or T bar, I, pivoted to the base or bent part of the fork B, and the third arm of which projects to serve as a lever for reversing the motion, and which may be held in place when adjusted by a toothed bar or other catch.

The T-bars I may be provided with springs so arranged that, when left free, they will bring the pawls into position for giving a forward motion to the machinery to be driven.

Having thus described my invention, what I claim as new, and desire to secure by Letters Patent, is—

1. The combination of the U bar or fork B, provided with two pairs of hook-pawls, D E, and springs and stops therefor, with the wheel F, provided with bolts G for converting a reciprocating into a rotary motion, substantially as herein shown and described.

2. The combination of the three three-armed or T bars and their connecting rods or chains with the U-bar or fork B, and with the two sets of hook-pawls D E, and springs and stops therefor, substantially as herein shown and described.

MINER G. MOSHER.

Witnesses:
G. F. HARGIS,
HIRAM IMBODEN.